(12) United States Patent
Westerling et al.

(10) Patent No.: US 10,801,873 B2
(45) Date of Patent: Oct. 13, 2020

(54) SYSTEM AND METHOD FOR DETERMINING LEVEL AND DENSITY DISTRIBUTION

(71) Applicant: Rosemount Tank Radar AB, Mölnlycke (SE)

(72) Inventors: Jan Westerling, Linköping (SE); Håkan Nyberg, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 129 days.

(21) Appl. No.: 16/140,783

(22) Filed: Sep. 25, 2018

(65) Prior Publication Data

US 2020/0096378 A1 Mar. 26, 2020

(51) Int. Cl.
*G01F 23/284* (2006.01)
*G01S 13/88* (2006.01)
*G01S 7/02* (2006.01)

(52) U.S. Cl.
CPC ............ *G01F 23/284* (2013.01); *G01S 7/025* (2013.01); *G01S 13/88* (2013.01)

(58) Field of Classification Search
CPC ......... G01F 23/284–2845; G01S 7/025; G01S 13/88
See application file for complete search history.

(56) References Cited

U.S. PATENT DOCUMENTS

| | | | |
|---|---|---|---|
| 5,136,299 A | 8/1992 | Edvardsson | |
| 5,543,720 A | 8/1996 | Edvardsson | |
| 6,915,689 B2 | 7/2005 | Edvardsson | |
| 7,106,247 B2 | 9/2006 | Edvardsson | |
| 7,345,622 B2 | 3/2008 | Edvardsson | |
| 7,532,155 B2 | 5/2009 | Kleman et al. | |
| 7,701,385 B2 | 4/2010 | Edvardsson | |

(Continued)

FOREIGN PATENT DOCUMENTS

CN 102235961 A 11/2011

OTHER PUBLICATIONS

Notification of Transmittal of the International Search Report and the Written Opinion of the International Searching Authority from International Application No. PCT/EP2019/074626, dated Nov. 27, 2019.

*Primary Examiner* — Matthew M Barker
(74) *Attorney, Agent, or Firm* — Westman, Champlin & Koehler, P.A.

(57) ABSTRACT

A radar level gauge system comprising a first transceiver; a second transceiver; an antenna arranged to radiate a first transmit signal generated by the first transceiver and a second transmit signal generated by the second transceiver, and to receive a first reflection signal and a second reflection signal; a tubular waveguide to guide the transmit signals towards the interface, and to guide the reflection signals back towards the antenna; a plurality of signal interacting structures arranged at different levels along a the tubular waveguide, to selectively interact with the second transmit signal to contribute to the second reflection signal; and processing circuitry to determine a level of the interface between liquid phase product and vapor phase product based on a relation between the first transmit signal and the first reflection signal, and a density distribution based on a relation between the second transmit signal and the second reflection signal.

7 Claims, 10 Drawing Sheets

(56) References Cited

U.S. PATENT DOCUMENTS

| | | | |
|---|---|---|---|
| 8,350,752 B2* | 1/2013 | Hemmendorff | G01F 23/284 |
| | | | 342/124 |
| 8,842,038 B2* | 9/2014 | Edvardsson | G01F 23/284 |
| | | | 342/124 |
| 9,410,904 B2* | 8/2016 | Edvardsson | G01N 22/00 |
| 9,778,089 B2* | 10/2017 | Edvardsson | G01S 7/4017 |
| 2008/0150789 A1* | 6/2008 | Jirskog | G01F 23/284 |
| | | | 342/124 |
| 2012/0137768 A1 | 6/2012 | Edvardsson | |
| 2013/0009803 A1 | 1/2013 | Edvardsson | |

* cited by examiner

SYSTEM AND METHOD FOR DETERMINING LEVEL AND DENSITY DISTRIBUTION

TECHNICAL FIELD OF THE INVENTION

The present invention relates to a radar level gauge system and to a method of determining a level of an interface between liquid phase product and vapor phase product in a tank, and a density distribution in the liquid phase product.

TECHNICAL BACKGROUND

Radar level gauge (RLG) systems are in wide use for determining the filling levels of products in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards to the transceiver.

Based on a relation between the transmit signal and the reflection signal, the distance to the surface of the product can be determined.

In some applications, non-contacting radar level gauge systems are used, together with so-called still-pipes for measuring the filling level in tanks containing Liquefied Natural Gas (LNG). Such tanks may be land-based, or on ships.

Depending on conditions in an LNG tank, the density of liquid phase product (mainly methane) may differ. The density at different levels in the tank may also be different. The density is therefore an important parameter, in addition to the volume for determining the quantity of product in the tank.

Furthermore, in LNG tanks, incidents involving a phenomenon called "rollover" have occurred. "Rollover" refers to the rapid release of LNG vapor that can occur as a result of the spontaneous mixing of layers of different densities of LNG in a storage or cargo tank. A pre-condition for rollover is that stratification has occurred, i.e. the existence in the tank of two separate layers of LNG of different density. Naturally, venting of LNG vapor should be avoided whenever possible.

Accordingly, it would be desirable to provide for improved determination of the amount of product in an LNG tank. In particular, it would be desirable to improve the determination of a density distribution in the liquid phase product in the tank in connection with determination of the level of the interface between liquid phase product and vapor phase product.

SUMMARY OF THE INVENTION

In view of the above, a general object of the present invention is to provide an improved radar level gauge system, in particular a radar level gauge system providing for improved determination of a density distribution in the liquid phase product in the tank in connection with determination of the level of the interface between liquid phase product and vapor phase product.

According to a first aspect of the present invention, it is therefore provided a radar level gauge system for determining a level of an interface between liquid phase product and vapor phase product in a tank, and a density distribution in the liquid phase product, the radar level gauge system comprising: a first transceiver for generating, transmitting and receiving electromagnetic signals having a first set of signal properties; a second transceiver for generating, transmitting and receiving electromagnetic signals having a second set of signal properties different from the first set of signal properties; an antenna coupled to the first transceiver and to the second transceiver, the antenna being arranged to radiate an electromagnetic first transmit signal having the first set of signal properties, and an electromagnetic second transmit signal having the second set of signal properties, and to receive a first reflection signal resulting from reflection of the first transmit signal and a second reflection signal resulting from reflection of the second transmit signal; a tubular waveguide extending from a top of the tank towards a bottom of the tank, the tubular waveguide being arranged and configured to guide the first transmit signal and the second transmit signal radiated by the antenna towards the interface between liquid phase product and vapor phase product and into the liquid phase product, and to guide the first reflection signal and the second reflection signal back towards the antenna; at least a first plurality of signal interacting structures arranged at different levels along a first segment of the tubular waveguide, each signal interacting structure in the first plurality of signal interacting structures being configured to selectively interact with the second transmit signal to contribute to the second reflection signal; and processing circuitry connected to the first transceiver and the second transceiver, the processing circuitry being configured to determine the level of the interface between liquid phase product and vapor phase product based on a relation between the first transmit signal and the first reflection signal, and the density distribution in the liquid phase product based on a relation between the second transmit signal and the second reflection signal.

Each of the "first transceiver" and the "second transceiver" may be one functional unit capable of transmitting and receiving electromagnetic signals, or may be a system comprising separate transmitter and receiver units.

The first transceiver and the second transceiver may advantageously constitute two separate and mutually independent measurement channels, sharing the same antenna. Hereby, the first reflection signal may practically only comprise reflections of the first transmit signal at impedance discontinuities experienced by the first transmit signal, and the second reflection signal may practically only comprise reflections of the second transmit signal at impedance discontinuities experienced by the second transmit signal.

An exemplary way of providing such mutually independent measurement channels is described in U.S. Pat. No. 7,701,385, which is hereby incorporated by reference in its entirety.

Each of the first transmit signal and the second transmit signal may advantageously be a microwave signal. For instance, each transmit signal may be frequency and/or amplitude modulated on a carrier in the microwave frequency range.

The above-mentioned first and second sets of signal properties may include any property of the first and second transmit signals, respectively, that can be used to separate the first and second reflection signals between the first and second transceivers and that provides for the desired selective interaction with the signal interacting structures. Such signal properties may, for example, include propagation mode and polarization.

Examples of suitable antennas may include a horn antenna, an array antenna, a solid dielectric antenna, and a parabolic antenna, etc.

The tubular waveguide may be provided in the form of a so-called still pipe, which is a metal tube with circular cross section extending from the top of the tank to the bottom of the tank. A microwave absorber may be arranged below the lower end of the tubular waveguide to at least reduce the amplitude of a bottom reflection signal. The tubular waveguide may be provided with openings distributed along the length thereof, to allow liquid phase product to move between an inside and an outside of the tubular waveguide, to thereby allow the level of the interface between liquid phase product and vapor phase product to be the same on the inside of the tubular waveguide as on the outside of the tubular waveguide.

That each signal interacting structure in the first plurality of signal interacting structures is arranged and configured to selectively interact with the second transmit signal to contribute to the second reflection signal, should be understood to mean that the interaction between each interacting structure in the first plurality of signal interacting structures and the second transmit signal is considerably stronger than any interaction between each interacting structure in the first plurality of signal interacting structures and the first transmit signal. Further, the signal interacting structures may advantageously be attached to the tubular waveguide.

It is well known, per se, that the propagation of an electromagnetic signal through a dielectric material depends on the dielectric constant of the material. In particular, it is well known that the propagation speed of the signal through the dielectric material is at least approximately inversely proportional to the square root of the relative dielectric constant of the material.

It is also well known, per se, that there is a correlation between the density of a dielectric material and the dielectric constant of the material, and that this correlation is given by the clausius-mossotti equation.

Accordingly, the density of a dielectric material can be determined based on an evaluation of the propagation of an electromagnetic signal through the material, either by a direct correlation, or indirectly through a determination of the dielectric constant, followed by a correlation between the dielectric constant and the density.

It should be noted that the processing circuitry may be provided as one device or several devices working together.

The present invention is based on the realization that the level of the interface between liquid phase product and vapor phase product, and the density distribution in the liquid phase product can be determined using different transceivers/measurement channels for transmitting and receiving electromagnetic signals with different sets of signal properties, sharing the same antenna and tubular waveguide. The present inventors have further realized that the determination of the level of the interface can be improved by providing signal interacting structures at different levels along at the tubular mounting structures, where each signal interacting structure is arranged and configured to substantially only interact with the signals in one of the measurement channels. Hereby, the signals interacting with the signal interacting structures can be used to determine the density distribution, and the signals exhibiting no or only relatively weak interaction with the signal interacting structures can be used to determine the level of the interface. This may facilitate a more precise determination of the level of the interface, in particular when the level of the interface is near the level of one of the signal interacting structures.

According to embodiments, the first plurality of signal interacting structures may comprise at least three signal interacting structures, mutually spaced apart along the first segment of said tubular waveguide. In principle, a measure of the density distribution in the liquid phase product may be determined based on signal interaction with two signal interacting structures that are arranged below the interface between liquid phase product and vapor phase product. By providing additional signal interacting structures, below the maximum allowed interface level in the tank, a more precise determination of the density distribution can be provided for.

According to embodiments, the first set of signal properties may comprise a first polarization, and the second set of signal properties may comprise a second polarization, different from the first polarization.

Advantageously, the first polarization may be a first linear polarization, and the second polarization may be a second linear polarization, orthogonal to the first linear polarization.

According to embodiments, the first set of signal properties may comprise a first propagation mode, and the second set of signal properties may comprise a second propagation mode, different from the first propagation mode. Examples of suitable propagation modes may include $TE_{11}$, $TM_{01}$, $TE_{21}$ and $TE_{31}$.

According to various embodiments, each signal interacting structure in the first plurality of signal interacting structures may be a reflecting structure arranged and configured to exhibit a first reflection coefficient for the first transmit signal and a second reflection coefficient for the second transmit signal, a ratio between the first reflection coefficient and the second reflection coefficient being less than 1:2. In other words, the first reflection coefficient may be less than half the second reflection coefficient. Advantageously, this ratio may be less than 1:3, and even more advantageously less than 1:4.

In embodiments where the first transmit signal and the second transmit signal exhibit different linear polarizations, the reflecting structures may, for example be provided in the form of pins, which may be made of metal or a dielectric material, or a composite of a conductive and a dielectric material. Such pins may have any cross-section.

In embodiments where the first transmit signal and the second transmit signal are propagated in different propagation modes, the reflecting structures may, for example, be provided in the form of one or several rings arranged inside the tubular waveguide. Examples of this type of reflecting structures are described in U.S. Pat. No. 7,345,622, which is hereby incorporated by reference in its entirety.

When reflecting signal interacting structures are used, the processing circuitry may, in embodiments, be configured to determine a first measure indicative of a distance between a first signal interacting structure and a second signal interacting structure in the first plurality of signal interacting structure based on a relation between the second transmit signal and the second reflection signal; a second measure indicative of a distance between a third signal interacting structure and a fourth signal interacting structure in the first plurality of signal interacting structure based on a relation between the second transmit signal and the second reflection signal; a first average density for a first level range in the tank based on the first measure; and a second average density for a second level range in the tank based on the second measure. The above-mentioned second and third signal interacting structures may be the same signal interacting structure.

The density (average density) may be determined based on a direct and previously determined correlation between density and measured electrical distance. Alternatively, the density (average density) may be determined based on a direct and previously determined correlation between dielectric constant and measured electrical distance, and on a known relation between dielectric constant and density. Furthermore, the (electrical) distance between two reflectors may be measured when the reflectors are unsubmerged in liquid phase product (for example when the tank has been emptied) and when the reflectors are submerged in liquid phase product. A relation between these measurements is sufficient to determine the change in dielectric constant, which can be used to determine the average density in the level segment between the two reflectors.

Moreover, it may be beneficial to measure the temperature in the tank and/or a change in a cross-section dimension (such as diameter for a circular cross-section) of the tubular waveguide, and to additionally base the determination of the density distribution on such measurement data.

According to various embodiments, each signal interacting structure in the first plurality of signal interacting structures may be a resonator arranged and configured to be excitable only by the second transmit signal, a resonance frequency of the resonator being indicative of a density of liquid phase product filling the resonator. The density distribution in the liquid phase product can be determined based on an evaluation of the frequency spectrum of the second reflection signal for different levels, to identify resonance frequencies of different resonators. In particular, the processing circuitry may be configured to determine a first density for a first level in the tank based on a resonance frequency of a first resonator arranged at the first level; and a second density for a second level in the tank based on a resonance frequency of a second resonator arranged at the second level.

The resonator may advantageously have a high Q-value, such as higher than 100.

In embodiments, the resonator may comprise a resonator cavity arranged to contain the liquid phase product when submerged in the liquid phase product. The resonance frequency of a resonator cavity will depend on the dielectric constant, and thus density, of the liquid phase product filling the resonator cavity. As an alternative to resonator cavities, dipole resonators may be used.

According to embodiments, the tubular waveguide may comprise at least a first plurality of openings to selectively allow an electromagnetic field resulting from the second transmit signal to be present on an outside of the tubular waveguide at each opening in the first plurality of openings; and each signal interacting structure in the first plurality of signal interacting structures may be arranged on the outside of the tubular waveguide at each opening in the first plurality of openings, to be excitable by the second transmit signal.

According to embodiments, the radar level gauge system may further comprise a second plurality of signal interacting structures arranged at different levels along a second segment of the tubular waveguide different from the first segment, each signal interacting structure in the second plurality of signal interacting structures being configured to selectively interact with the first transmit signal to contribute to the first reflection signal; and the processing circuitry may be configured to: determine, for levels along the first segment of the tubular waveguide, the level of the interface between liquid phase product and vapor phase product based on a relation between the first transmit signal and the first reflection signal, and the density distribution in the liquid phase product based on the second reflection signal along the first segment of the tubular waveguide and based on the first reflection signal along the second segment of the tubular waveguide; and determine, for levels along the second segment of the tubular waveguide, the level of the interface between liquid phase product and vapor phase product based on a relation between the second transmit signal and the second reflection signal, and the density distribution in the liquid phase product based on the first reflection signal along the second segment of the tubular waveguide.

In these embodiments, a larger number of signal interacting structures may be used without excessive disturbance of the determination of the level of the interface. This allows for a more precise determination of the density distribution in the liquid phase product and/or determination of the density distribution in a larger (higher) tank.

According to a second aspect of the present invention, it is provided a method of determining a level of an interface between liquid phase product and vapor phase product in a tank, and a density distribution in the liquid phase product, using a radar level gauge system comprising: a first transceiver; a second transceiver; an antenna coupled to the first transceiver and to the second transceiver; a tubular waveguide extending from a top of the tank towards a bottom of the tank; at least a first plurality of signal interacting structures arranged at different levels along a first segment of the tubular waveguide, each signal interacting structure in the first plurality of signal interacting structures being configured to selectively interact with electromagnetic signals having a given set of signal properties; and processing circuitry connected to the first transceiver and the second transceiver, the method comprising the steps of: transmitting, by the first transceiver, an electromagnetic first transmit signal having a first set of signal properties, different from the given set of signal properties; transmitting, by the second transceiver, an electromagnetic second transmit signal having a second set of signal properties, constituting the given set of signal properties; radiating, by the antenna, the first transmit signal and the second transmit signal into the tubular waveguide; receiving, by the antenna, an electromagnetic first reflection signal resulting from reflection of the first transmit signal, and an electromagnetic second reflection signal resulting from reflection of the second transmit signal; determining, by the processing circuitry, the level of the interface between liquid phase product and vapor phase product based on a relation between the first transmit signal and the first reflection signal; and determining, by the processing circuitry, the density distribution in the liquid phase product based on the second reflection signal.

It should be noted that the above steps need not necessarily be carried out in any particular order, and that at least some of the steps may be carried out simultaneously.

Further effects and variations of the present second aspect of the invention are largely similar to those described above with reference to the first aspect of the invention.

In summary, embodiments of the present invention thus relate to a radar level gauge system comprising a first transceiver; a second transceiver; an antenna arranged to radiate a first transmit signal generated by the first transceiver and a second transmit signal generated by the second transceiver, and to receive a first reflection signal and a second reflection signal; a tubular waveguide to guide the transmit signals towards the interface, and to guide the reflection signals back towards the antenna; a plurality of signal interacting structures arranged at different levels along a the tubular waveguide, to selectively interact with the second transmit signal to contribute to the second reflection signal; and processing circuitry to determine a level of the interface between liquid phase product and vapor phase product based on a relation between the first transmit signal and the first reflection signal, and a density distribution based on a relation between the second transmit signal and the second reflection signal.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS OF THE INVENTION

In the present detailed description, various embodiments of the present invention are mainly discussed with reference to an FMCW-type radar level gauge system.

It should be noted that this by no means limits the scope of the present invention, which also covers a pulsed radar level gauge system using electromagnetic signals in a suitable frequency range.

Figure 1:
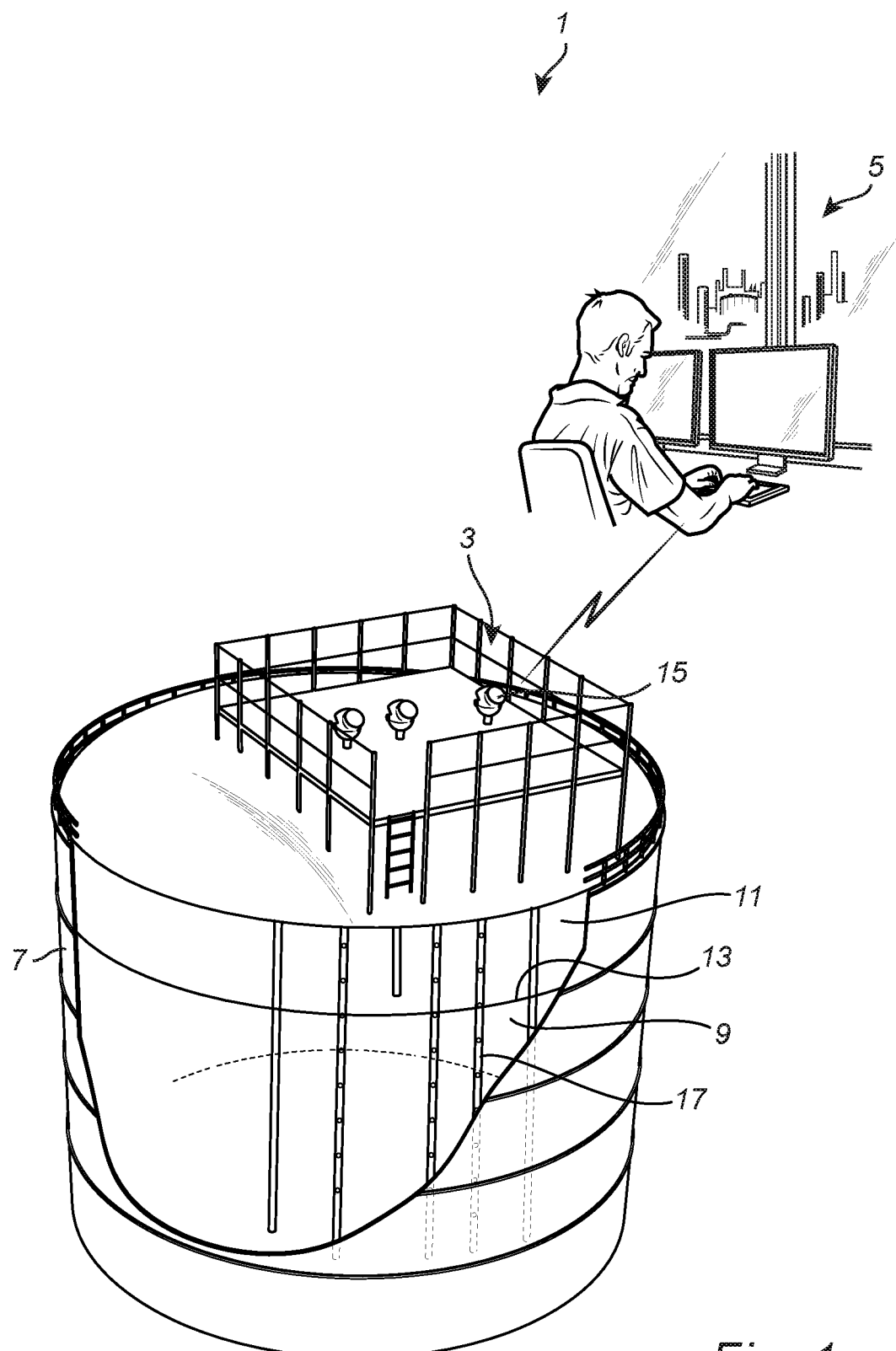
FIG. 1 schematically illustrates an exemplary tank monitoring arrangement comprising a radar level gauge system according to an embodiment of the present invention.

FIG. 1 schematically shows a tank monitoring arrangement 1 comprising a radar level gauge system 3 according to an example embodiment of the present invention, and a host system 5 illustrated as a control room.

The radar level gauge system 3 is installed at a tank 7, together with additional gauges, together forming a so-called inventory tank gauging system.

The tank 7, which may be an LNG tank, contains liquid phase product 9 and vapor phase product 11.

The radar level gauge system 3 is installed to measure the level of an interface 13 between liquid phase product 9 and vapor phase product 11, as well as a density distribution in the liquid phase product 9. The radar level gauge system 3 comprises a measuring unit 15, an antenna (not visible in FIG. 1), a tubular waveguide 17, and at least a first plurality of signal interacting structures (not visible in FIG. 1) arranged at different levels along a first segment of the tubular waveguide 17.

Figure 2:
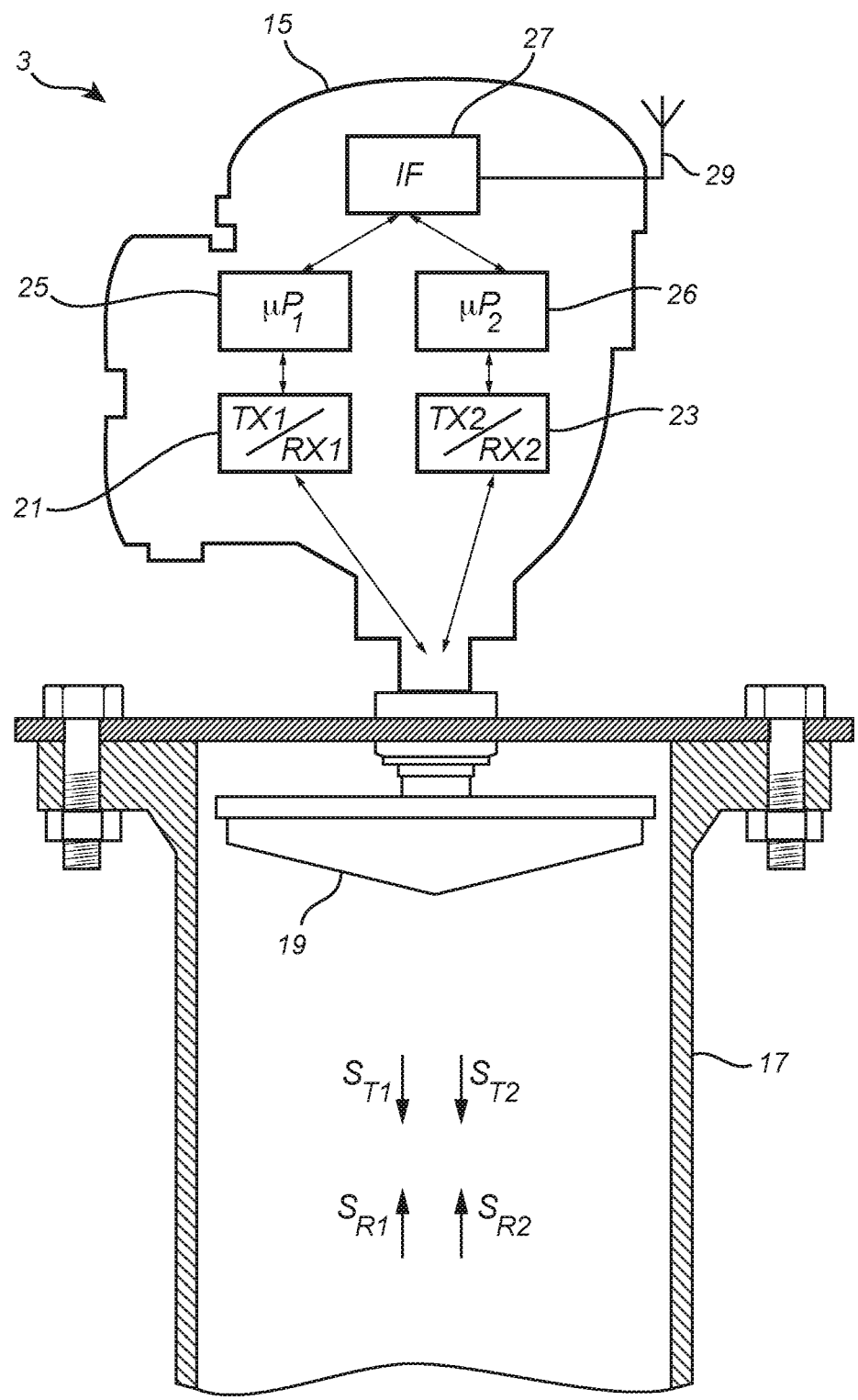
FIG. 2 is schematic illustration of the measurement unit comprised in the radar level gauge system in FIG. 1.

Referring to the schematic illustration in FIG. 2, the radar level gauge system 3 comprises an antenna 19, here in the form of an array antenna, arranged to radiate electromagnetic signals into the tubular waveguide 17. As is schematically illustrated in FIG. 2, in the form of a high level block diagram in the physical outline of the measurement unit 15, the radar level gauge system 3 comprises a first transceiver 21, a second transceiver 23, processing circuitry comprising a first measurement processor 25 and a second measurement processor 26, a communication interface 27, and a communication antenna 29.

As is schematically illustrated in FIG. 2, the first measurement processor 25 controls the first transceiver 21 to generate, transmit and receive electromagnetic signals having a first set of signal properties, and the second measurement processor 26 controls the second transceiver 23 to generate, transmit and receive electromagnetic signals having a second set of signal properties. The antenna 19 is coupled to the first transceiver 21 and the second transceiver 23, and configured to radiate a first transmit signal $S_{T1}$ from the first transceiver 21 and to return a first reflection signal $S_{R1}$ resulting from reflection of the first transmit signal, and to radiate a second transmit signal $S_{T2}$ from the second transceiver 23 and to return a second reflection signal $S_{R2}$ resulting from reflection of the second transmit signal.

The first measurement processor 25 determines the level of the interface 13 based on the first transmit signal $S_{T1}$ and the first reflected signal $S_{R1}$, and the second measurement processor 26 determines the density distribution in the liquid phase product based on the second transmit signal $S_{T2}$ and the second reflected signal $S_{R2}$. A measure indicative of the level of the interface 13, as well as a measure indicative the density distribution is provided to an external device, such as a control center from the first measurement processor 25 and the second measurement processor 26 via the communication interface 27 and the communication antenna 29. The radar level gauge system 3 may advantageously be configured according to the so-called WirelessHART communication protocol (IEC 62591).

Using the radar level gauge system 3 according to various embodiments of the present invention, the level of the interface 13 may be determined based on the phase difference between a phase-modulated first transmit signal $S_{T1}$ and the first reflection signal $S_{R1}$. The density distribution in the liquid phase product 9 may be determined based on the phase difference between a phase-modulated second transmit signal $S_{T2}$ and the second reflection signal $S_{R2}$. This type of measurement scheme is often generally referred to as FMCW (Frequency Modulated Continuous Wave), which is, per se, well known to those of ordinary skill in the art.

Figure 3:
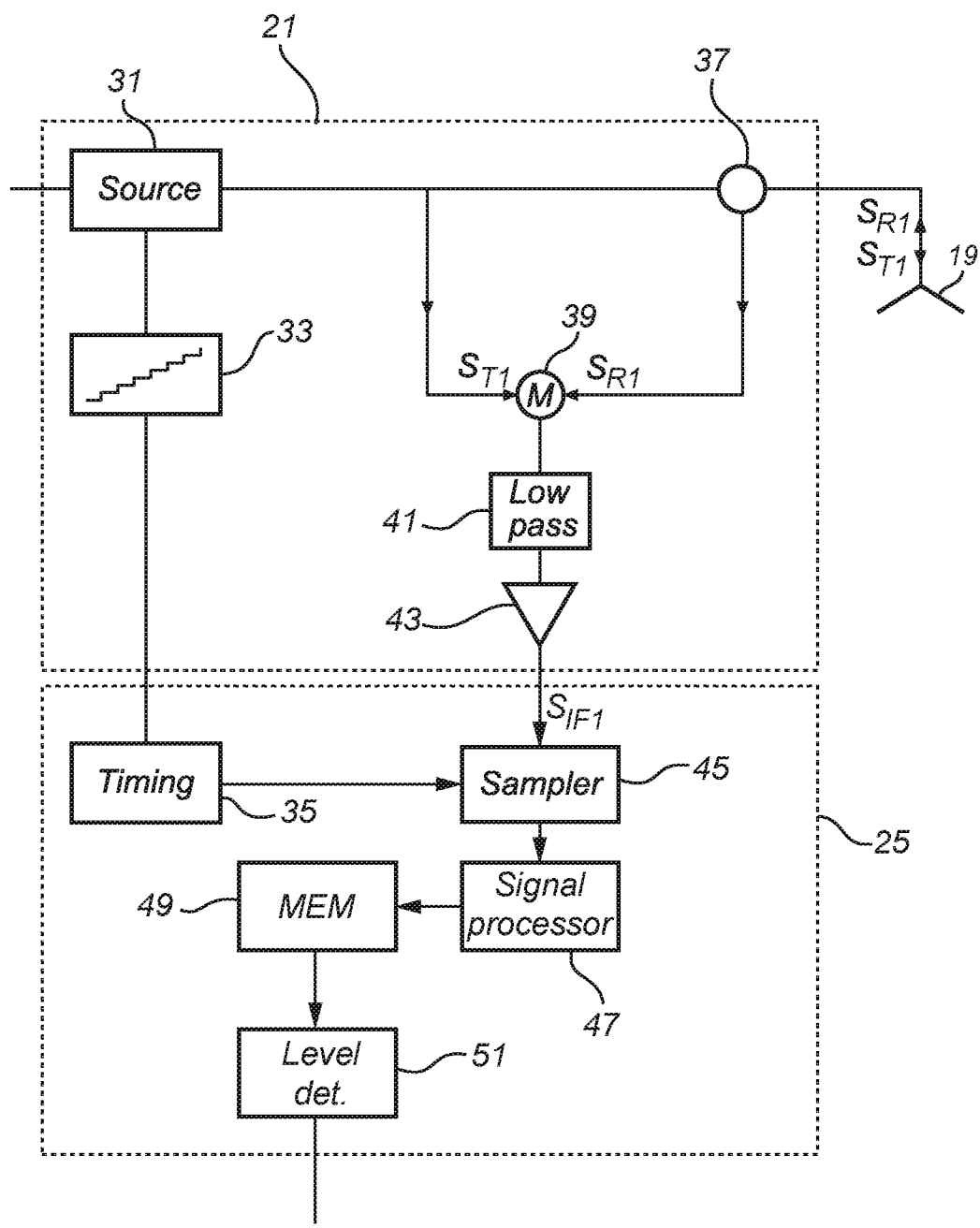
FIG. 3 is a partial schematic block diagram of a radar level gauge system according to an embodiment of the present invention.

Referring now to FIG. 3, there is shown a more detailed block diagram of an example configuration of a first measurement channel comprising the first transceiver 21 and the first measurement processor 25 in FIG. 2. It should be understood that a second measurement channel comprising the second transceiver 23 and the second measurement processor 26 may have a generally identical configuration.

The first transceiver 21 is here shown as including a microwave source 31 driven by a step generator 33, in turn controlled by timing circuitry 35 included in the first measurement processor 25. The microwave source 31 is connected to the antenna 19 via a power divider 37. The power divider 37 is arranged to connect a reflection signal from the antenna 19 to a mixer 39, which is also connected to receive the signal from the microwave source 31. The mixer output is connected to a low pass filter 41 and an amplifier 43.

The first measurement processor 25 here includes, in addition to the timing circuitry 35 mentioned above, a sampler 45 configured to receive and sample the intermediate frequency signal $S_{IF1}$ output by the mixer 39, low pass filtered by the low pass filter 41 and amplified by the amplifier 43. The sampler 45 may, for example, comprise a sample-and-hold circuit in combination with an A/D-converter, or be realized as a sigma-delta converter. The sampler 45 is controlled by the timing circuitry 35 to be synchronized with the transmit signal $S_{T1}$. The first measurement processor 25 further includes a signal processor 47, a memory 49, and a level determinator 51.

While the elements of the first transceiver 21 and the second transceiver 23 are typically implemented in hardware, and form part of an integrated unit normally referred to as a microwave unit, at least some portions of the first measurement processor 25 and the second measurement processor 26 may typically be embodied by software modules executed by an embedded processor. The invention is not restricted to this particular realization, and any implementation found suitable to realize the herein described functionality may be contemplated.

Figure 4:
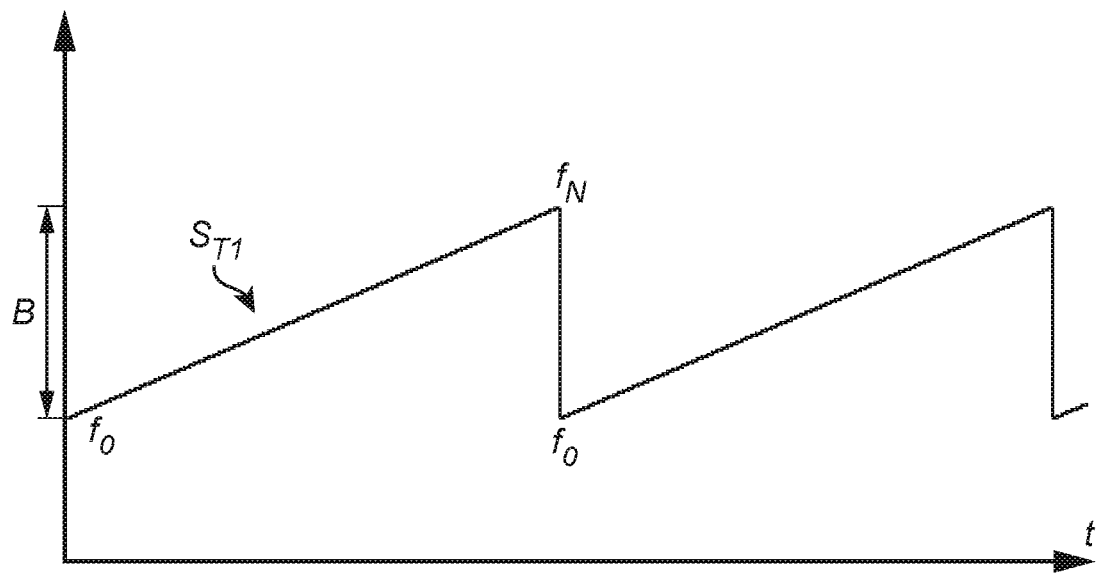
FIG. 4 schematically illustrates an example of a transmit signal transmitted by a transceiver in a radar level gauge system according to an embodiment of the invention.

With reference to FIG. 3, the timing circuitry 35 controls the microwave source 31 via the step generator 33 to form the transmit signal $S_{T1}$. Referring to FIG. 4, the transmit signal $S_{T1}$ is provided in the form of a time sequence $f_0$-$f_N$ of a number of discrete and mutually different frequencies $f_n$. As is schematically indicated in FIG. 4, the discrete and mutually different frequencies $f_0$-$f_N$ define a bandwidth B. In this particular example, the frequencies adjacent in terms of frequency are also adjacent in the time sequence, but this is not necessarily the case. Alternatively, the discrete and mutually different frequencies may be output in an arbitrary but known order.

The reflection signal $S_{R1}$ results from reflection of the transmit signal $S_{T1}$ at impedance discontinuities (including the interface 13 indicated in FIG. 1). Due to the time-of-flight from the radar level gauge system to different impedance discontinuities and back, the reflection signal $S_{R1}$ will be a delayed copy of the transmit signal $S_{T1}$, where the portions of the reflection signal $S_{R1}$ reflected from the different impedance discontinuities will exhibit different phase differences as compared to the transmit signal $S_{T1}$. The phase differences will, furthermore, change in steps with the changes in transmitted discrete frequency $f_n$.

Figure 5:
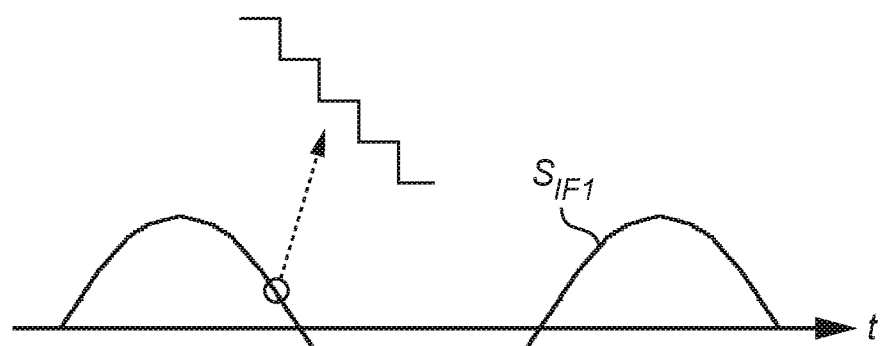
FIG. 5 is a diagram showing the intermediate frequency signal formed based on the transmit signal and the reflection signal.

An intermediate frequency signal $S_{IF1}$ is formed by combining the transmit signal $S_{T1}$ and the reflection signal $S_{R1}$ in the mixer 39. The intermediate frequency signal $S_{IF1}$ is schematically shown in FIG. 5.

If a transmit signal with a continuously varying frequency had been used, the intermediate frequency signal would have been a continuous signal comprising one frequency component for each time-of-flight corresponding to the different impedance discontinuities encountered by the transmit signal.

Since the transmit signal $S_{T1}$ is, in this particular example, instead a sequence of discrete frequencies $f_n$, the phase difference will vary in steps, which means that the intermediate frequency signal $S_{IF1}$ will be piece-wise constant with the same duration of the constant portions as the duration of transmission of the different frequencies $f_n$ of the transmit signal $S_{T1}$. This is schematically indicated in FIG. 5.

The intermediate frequency signal $S_{IF1}$, which has been sampled by the sampler 45 in FIG. 3 is processed by the signal processor 47 in order to determine a data set indicative of echoes from impedance discontinuities. The intermediate frequency signal $S_{IF1}$ in FIG. 5 is first transformed from the time domain to the frequency domain using, for example, FFT (Fast Fourier Transform). Following transformation to the frequency domain of the intermediate frequency signal $S_{IF1}$, the resulting frequency spectrum is transformed to an echo curve, which is used by the level determinator 51 to determine the level of the interface 13 between liquid phase product 9 and vapor phase product 11.

In the second measurement channel, the second measurement processor 26 may comprise a density distribution determinator instead of the level determinator 51 of the first measurement channel described above.

In the first measurement channel, the first transceiver 21 generates, transmits and receives electromagnetic signal having a first set of signal properties, and in the second measurement channel, the second transceiver 23 generates, transmits and receives electromagnetic signal having a second set of signal properties. As was mentioned further above, the signal properties may, for example, include polarization state and/or microwave propagation mode, etc. The signal interacting structures arranged at different levels along the tubular waveguide 17 are configured to selectively interact with a transmit signal, depending on the set of signal properties exhibited by the transmit signal.

Figure 6:
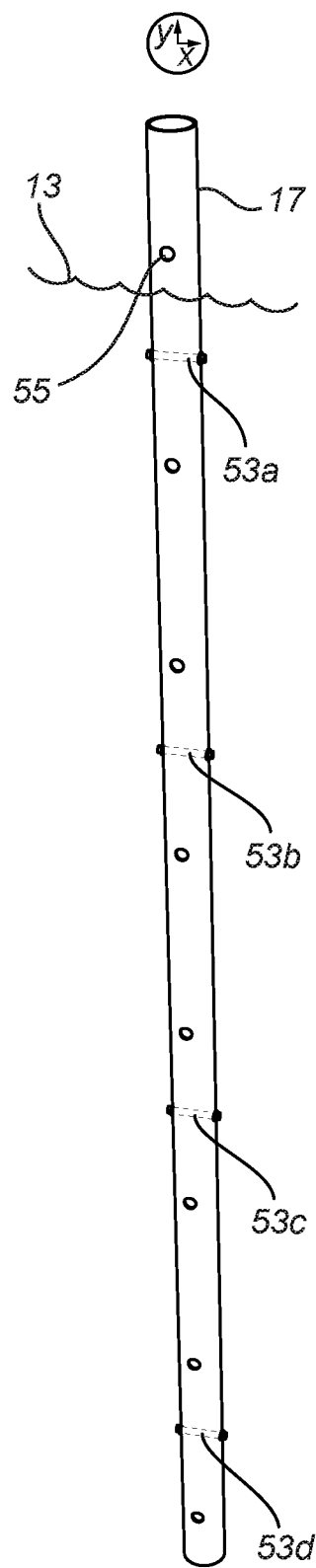
FIG. 6 schematically illustrates a first example configuration of signal interacting structures, including a first plurality of signal interacting structures, in the form of reflectors, arranged at different levels along the tubular waveguide.

FIG. 6 schematically illustrates a first example configuration of signal interacting structures, including a first plurality of signal interacting structures, in the form of reflectors 53a-d, arranged at different levels along the tubular waveguide 17. As is schematically shown in FIG. 6, the tubular waveguide 17 (often referred to as still pipe) comprises a plurality of openings 55 (only one of these is indicated with a reference numeral to avoid cluttering the drawings) to allow equalization of the level of the interface 13 on the inside and on the outside of the tubular waveguide 17.

In FIG. 6, each reflector 53a-d is provided in the form of a pin oriented in the 'x'-direction as is schematically indicated in FIG. 6. The pin, which may be made of metal or a suitable dielectric material, will exhibit a considerably higher reflection coefficient for an electromagnetic signal with a linear polarization along the 'x'-direction, than for an electromagnetic signal with a linear polarization along the 'y'-direction. For the configuration of the signal interacting structures 53a-d in FIG. 6, the first transmit signal $S_{T1}$ should preferably be linearly polarized along the 'y'-direction, and the second transmit signal $S_{T2}$ should preferably be linearly polarized along the 'x'-direction. This means that the first transmit signal $S_{T1}$ will propagate through the tubular waveguide with very little interaction with the reflectors 53a-d, and result in a relatively undisturbed first reflection signal $S_{R1}$ having a strong reflection signal component from reflection of the first transmit signal $S_{T1}$ at the interface 13 between liquid state product 9 and vapor state product 11. The second transmit signal $S_{T2}$, on the other hand, will interact strongly with the reflectors 53a-d, resulting in strong reflection signal components from reflections at the reflectors 53a-d. A detailed description of how to provide a linearly polarized transmit signal, and how the reflectors 53a-d may suitably be configured is omitted, since this is, per se, well known to one of ordinary skill in the art of radar level gauging. For instance, U.S. Pat. No. 5,136,299 may be referred to. This document is hereby incorporated by reference, in its entirety.

Figure 7A:
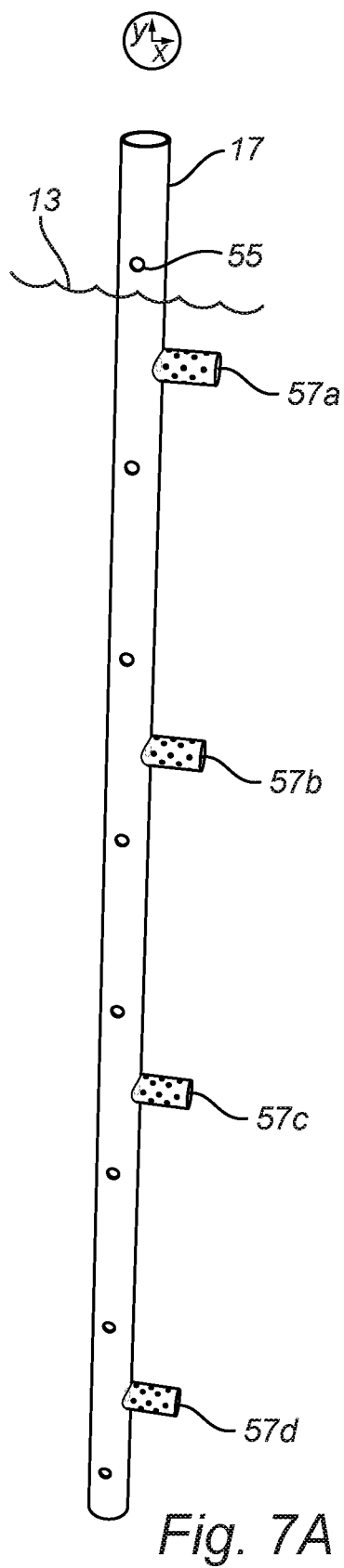
FIG. 7A schematically illustrates a second example configuration of signal interacting structures, including a first plurality of signal interacting structures, in the form of resonators, arranged at different levels along the tubular waveguide.

FIG. 7A schematically illustrates a second example configuration of signal interacting structures, including a first plurality of signal interacting structures, in the form of resonators 57a-d, arranged at different levels along the tubular waveguide 17.

In FIG. 7A, each resonator 57a-d is provided in the form of a horizontally aligned microwave resonator attached to the outside of the tubular waveguide 17, and aligned with a corresponding opening 59a-d in the wall of the tubular resonator 17. An example microwave resonator configuration will be described in more detail below with reference to FIG. 7B.

An electromagnetic signal with a linear polarization along the 'x'-direction will exhibit some leakage through the openings 59a-d, and the leaked signal will interact with the microwave resonators 57a-d. An electromagnetic signal with a linear polarization along the 'y'-direction will exhibit no or only very small leakage through the openings 59a-d, and thus be unaffected by the openings 59a-d and the microwave resonators 57a-d. For the configuration of the signal interacting structures 57a-d in FIG. 7A, the first transmit signal $S_{T1}$ should preferably be linearly polarized along the 'y'-direction, and the second transmit signal $S_{T2}$ should preferably be linearly polarized along the 'x'-direction. This means that the first transmit signal $S_{T1}$ will propagate through the tubular waveguide 17 with very little interaction with the microwave resonators 57a-d, and result in a relatively undisturbed first reflection signal $S_{R1}$ having a strong reflection signal component from reflection of the first transmit signal $S_{T1}$ at the interface 13 between liquid state product 9 and vapor state product 11. The second transmit signal $S_{T2}$, on the other hand, will interact strongly with the microwave resonators 57a-d, resulting in peaks in the second reflection signal $S_{R2}$ for the respective resonance frequencies of the microwave resonators 57a-d. The resonance frequency of a particular microwave resonator 57a-d will depend on the dielectric constant of the liquid phase product 9 filling and/or surrounding the microwave resonator 57a-d. Based on the dielectric constants at the different levels, densities at the different levels can be determined, as is described in greater detail in U.S. Pat. No. 9,410,904, which is hereby incorporated by reference in its entirety.

Figure 7B:
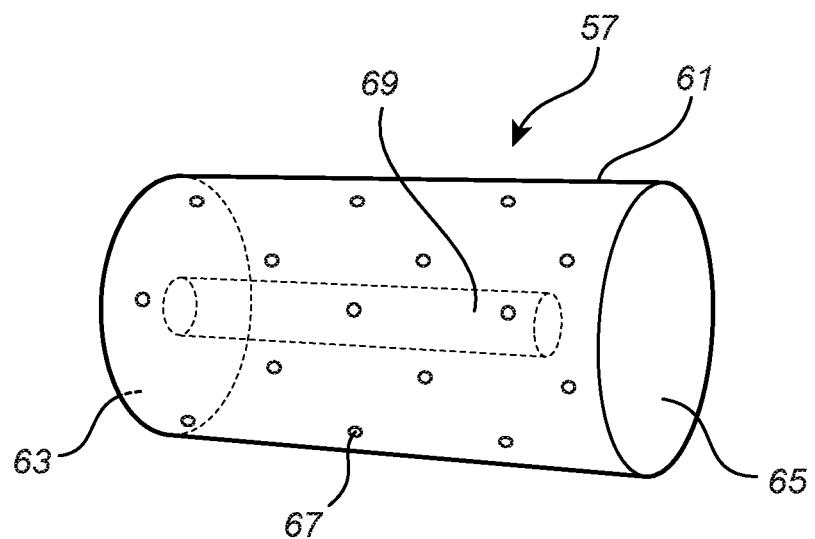
FIG. 7B is a schematic illustration of an example configuration of the resonators in FIG. 7A.

Referring to FIG. 7B, a horizontally aligned microwave resonator 57 comprises a housing 61 having a circular cylindrical shape. The housing 61 has an open end 63 and a closed end 65. To further ease the draining, and filling of liquid phase product 9 in the microwave resonator 57, holes 67 are provided in the housing 61. These holes 67 may advantageously be relatively small, preferably having a diameter less than 4 mm. The suitable diameter for a given application is determined by the diameter of the resonator and by the resonance frequency. The holes 67 should be sufficiently small such that they do not influence the properties of the resonator, in particular smaller than the wavelength of the resonance frequency. Furthermore, the microwave resonator 57 comprises an inner rod 69 which is fixed to the closed end 63 and extends from the closed end 63 towards the open end 65 within the housing 61. The functionality of the microwave resonator 57 in FIG. 7B, as well as other feasible microwave resonator designs are described in U.S. Pat. No. 9,410,904.

Figure 8:
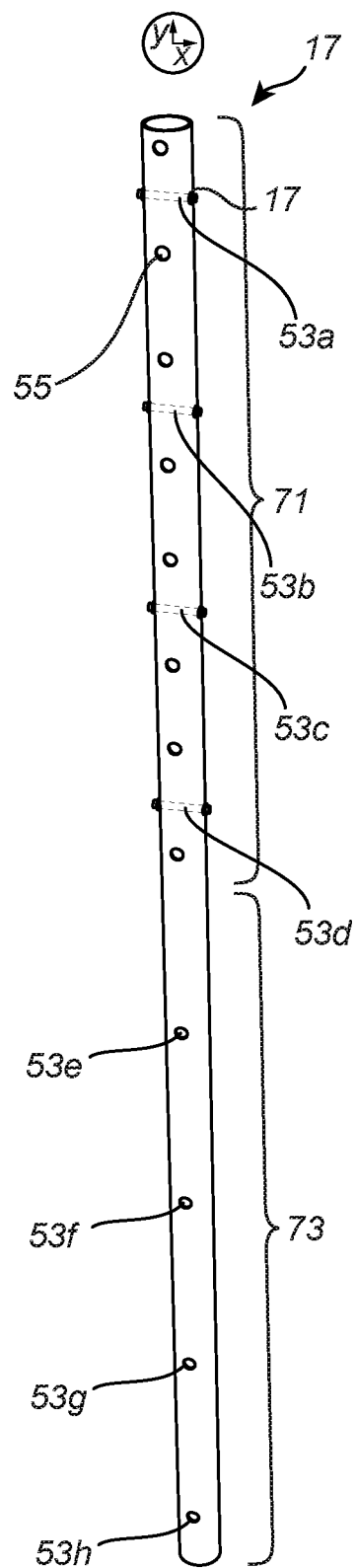
FIG. 8 schematically illustrates a third example configuration of signal interacting structures, including a first plurality of signal interacting structures and a second plurality of signal interacting structures, in the form of reflectors, arranged at different levels along a first segment and a second segment of the tubular waveguide, respectively.

FIG. 8 schematically illustrates a third example configuration of signal interacting structures, including a first plurality of signal interacting structures and a second plurality of signal interacting structures, in the form of reflectors, arranged at different levels along a first segment 71 and a second segment 73 of the tubular waveguide 17, respectively.

In FIG. 8, each reflector 53a-h is provided in the form of a pin. Each pin 53a-d in the first plurality of signal interacting structures is oriented in the 'x'-direction as is schematically indicated in FIG. 8, and will thus exhibit a considerably higher reflection coefficient for an electromagnetic signal with a linear polarization along the 'x'-direction, than for an electromagnetic signal with a linear polarization along the 'y'-direction. Each pin 53e-h in the second plurality of signal interacting structures is oriented in the 'y'-direction as is schematically indicated in FIG. 8, and will thus exhibit a considerably higher reflection coefficient for an electromagnetic signal with a linear polarization along the 'y'-direction, than for an electromagnetic signal with a linear polarization along the 'x'-direction.

Since, in this example, the first transmit signal $S_{T1}$ is linearly polarized along the 'y'-direction, and the second transmit signal $S_{T2}$ is linearly polarized along the 'x'-direction, the first transmit signal $S_{T1}$ will practically only interact with the reflectors 53e-h in the second plurality of reflectors, and the second transmit signal $S_{T2}$ will practically only interact with the reflectors 53a-d in the first plurality of reflectors. Accordingly, the first transmit signal $S_{T1}$ and the first reflection signal $S_{R1}$ may advantageously be used for determining the level of the interface 13 when the level of the interface 13 is in the first segment 71 of the tubular waveguide 17, as well as for determining the density distribution along the second segment 73 of the tubular waveguide 17. When the level of the interface 13 is in the first segment 71 of the tubular waveguide 17 the density distribution along (the submerged portion of) the first segment 71 of the tubular waveguide 17 is determined based on the second transmit signal $S_{T2}$ and the second reflection signal $S_{R2}$ as described above with reference to FIG. 6. When the level of the interface 13 is in the second segment 73 of the tubular waveguide 17, the second transmit signal $S_{T2}$ and the second reflection signal $S_{R2}$ may advantageously be used for determining the level of the interface 13.

Figure 9:
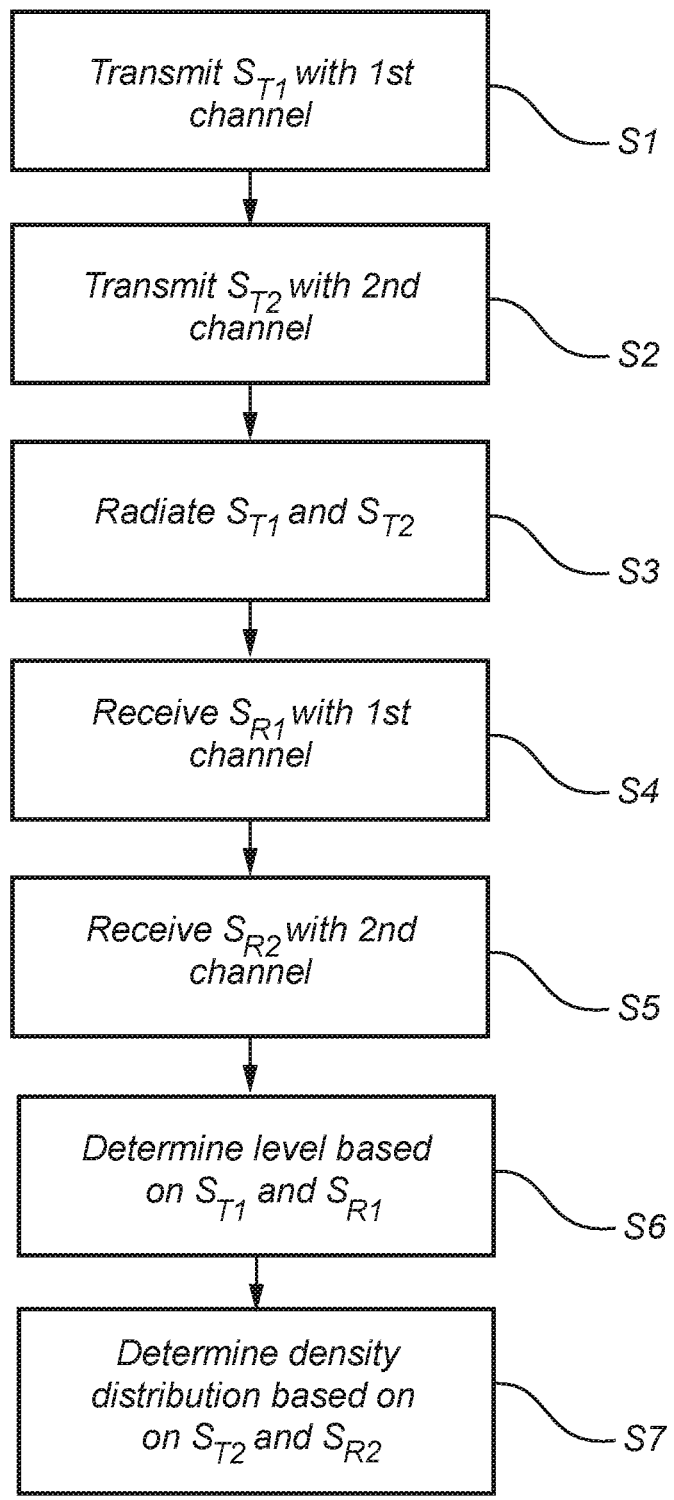
FIG. 9 is a flow-chart schematically illustrating an example embodiment of the method according to the present invention.

FIG. 9 is a flow-chart schematically illustrating an example embodiment of the method according to the present invention.

In a first step S1, an electromagnetic first transmit signal $S_{T1}$ having a first set of signal properties is transmitted by the first measurement channel including the first transceiver 21 and the first measurement processor 25. As described above, the first transmit signal $S_{T1}$ may, for example, exhibit a linear polarization along the 'y' direction in FIG. 6.

In the second step S2, which may take place simultaneously with the first step S1, an electromagnetic second transmit signal $S_{T2}$ having a second set of signal properties is transmitted by the second measurement channel including the second transceiver 23 and the second measurement processor 26. As described above, the second transmit signal $S_{T2}$ may, for example, exhibit a linear polarization along the 'x' direction in FIG. 6.

In the third step S3, the first $S_{T1}$ and second $S_{T2}$ transmit signals are radiated by the antenna 19 into the tubular waveguide 17, which guides the first $S_{T1}$ and second $S_{T2}$ transmit signals towards and into the liquid phase product 9, and first $S_{R1}$ and second $S_{R2}$ reflection signals back towards the first 21 and second 23 transceivers.

In the subsequent step S4, the first reflection signal $S_{R1}$ is received with the first measurement channel including the first transceiver 21 and the first measurement processor 25, and in step S5, which may take place simultaneously with S4, the second reflection signal $S_{R2}$ is received with the second measurement channel including the second transceiver 23 and the second measurement processor 26.

In the next step S6, the level of the interface 13 between liquid phase product 9 and vapor phase product 11 is determined based on the first transmit signal $S_{T1}$ and the first reflection signal $S_{R1}$.

In step S7, the density distribution in the liquid phase product is determined based on the second transmit signal $S_{T2}$ and the second reflection signal $S_{R2}$.

The determination of the level of the interface 13, as well as the determination of the density distribution in the liquid phase product 9 will be described in greater detail with reference to the echo curves in FIGS. 10A-B.

Figure 10A:
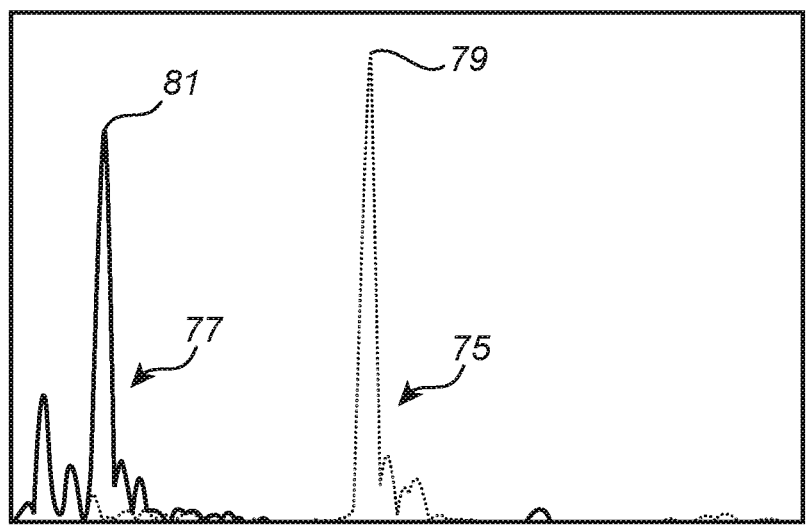
FIG. 10A is a diagram showing example echo curves based on the first transmit signal and the first reflection signal.
Figure 10B:
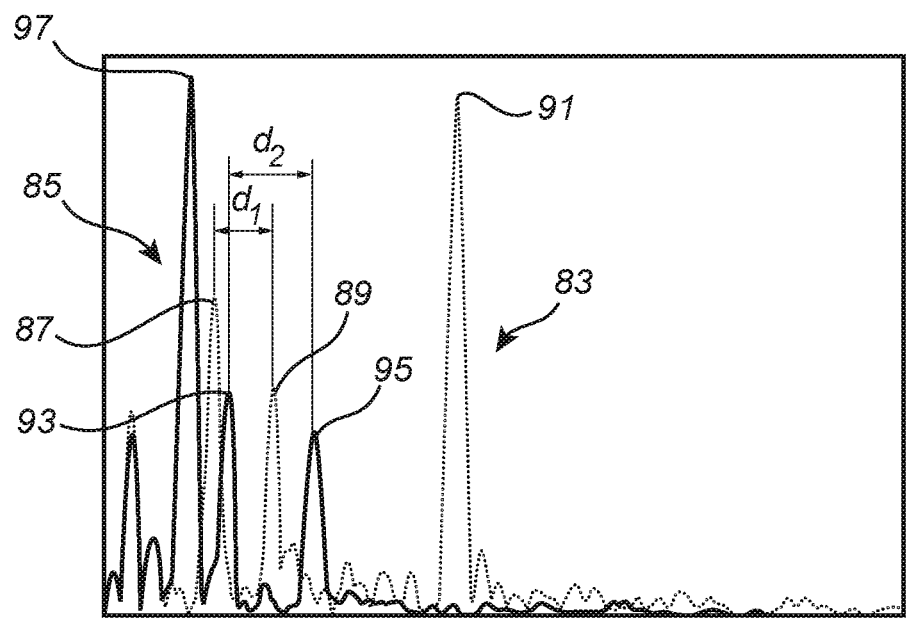
FIG. 10B is a diagram showing example echo curves based on the second transmit signal and the second reflection signal.

FIG. 10A is a diagram with example echo curves based on the first transmit signal $S_{T1}$ and the first reflection signal $S_{R1}$ for two different distances to the interface 13, and FIG. 10B is a diagram with example echo curves based on the second transmit signal $S_{T2}$ and the second reflection signal $S_{R2}$ for the two different distances to the interface 13. The signal interacting structure configuration used for the measurements resulting in the echo curves in FIGS. 10A-B substantially corresponds to the configuration in FIG. 6, with the difference that only two of the reflector pins 53a-d are installed, to simplify the echo curves and the description.

The diagram in FIG. 10A includes a first echo curve 75 for a low interface level, and a second echo curve 77 for a high interface level. The echo curves in FIG. 10A have been determined using the first measurement channel including the first transceiver 21 and the first measurement processor 25 as described further above. As was explained in connection with FIG. 6, the first transmit signal $S_{T1}$, which is linearly polarized in the 'y' direction is substantially not influenced by the reflectors 53a-d. Therefore, the first echo curve 75 only includes one significant peak 79, based on which the (relatively low) level of the interface 13 can be determined, and the second echo curve 77 only includes one significant peak 81, based on which the (relatively high) level of the interface 13 can be determined.

As for the diagram in FIG. 10A, the diagram in FIG. 10B includes a first echo curve 83 for the low interface level, and a second echo curve 85 for the high interface level. The echo curves in FIG. 10B have been determined using the second measurement channel including the second transceiver 23 and the second measurement processor 26 as described further above. As was explained in connection with FIG. 6, the second transmit signal $S_{T2}$, which is linearly polarized in the 'x' direction is relatively strongly reflected by the reflectors 53a-d. Therefore, the first echo curve 83 includes a first peak 87 indicative of the electrical distance to a first reflector 53a, a second peak 89 indicative of the electrical distance to a second reflector 53b, and a third peak 91 indicative of the (relatively low) level of the interface 13. The second echo curve 85 includes a first peak 93 indicative of the electrical distance to a first reflector 53a, a second peak 95 indicative of the electrical distance to a second reflector 53b, and a third peak 97 indicative of the (relatively high) level of the interface 13.

Based on the first peak 87 and the second peak 89 of the first echo curve 83, a first electrical distance d1 between the first reflector 53a and the second reflector 53b can be determined for the case where the first reflector 53a and the second reflector 53b are above the level of the interface 13. Based on the first peak 93 and the second peak 95 of the second echo curve 85, a second electrical distance d2 between the first reflector 53a and the second reflector 53b can be determined for the case where the first reflector 53a and the second reflector 53b are below the level of the interface 13.

The first $d_1$ and second $d_2$ electrical distances referred to above are proportional to the periods of time it takes the electromagnetic signals to travel from the first reflector 53a to the second reflector 53b in the two situations (both reflectors above the interface 13 and both reflectors below the interface 13, respectively). As is well known to those of ordinary skill in the art, the propagation velocity of electromagnetic signals propagating from the level of the first reflector 53a to the level of the second reflector 53b is inversely proportional to the square root of the (average) relative dielectric constant of the material between the first reflector 53a and the second reflector 53b. Based on this knowledge, knowledge of the relative dielectric constant of vapor phase product, and the fact that the actual distance between the two reflectors 53a-b is the same in both measurements, the average relative dielectric constant of the liquid phase product 9 in the tank between the level of the first reflector 53a and the level of the second reflector 53b (second echo curve 85) can be determined.

Knowing the dielectric constant will allow the average density in the tank between the level of the first reflector 53a and the second reflector 53b to be derived using the Clausius-Mosotti equation (or the equivalent Lorentz-Lorentz equation).

$$\frac{\varepsilon_r - 1}{\varepsilon_r + 2} = \kappa \rho$$

The proportionality constant κ is an intrinsic characteristic constant expressing the electronic polarizability of the liquid molecule. Where the molecule holds a permanent dipole moment, this characteristic constant depends on the temperature.

In a typical volume of liquefied natural gas, the characteristic constant κ representing the electronic polarizability varies depending on the composition of the liquid.

A typical value may be $\kappa = 4 \times 10^{-4}$ m$^3$/kg. This value suggests that liquefied natural gas volumes with dielectric constant $\varepsilon_r = 1.69$ have a density close to $\rho = 467$ kg/m$^3$.

Alternatively, the density can be determined based on an empirical relation between the dielectric constant and the density, where additional parameters, such as temperature and/or pressure, may also be taken into account to improve the determination of the density distribution.

In the above example, the (average) density is determined for one level (range) only, for the sake of simplicity. To determine the density distribution in the liquid phase products, the density should be determined for at least two different levels or level ranges.

As is clear from the echo curves in FIG. 10B, it would be possible to determine the density distribution of the liquid phase material 9 and measure the level of the interface 13 using the same measurement channel. However, the present inventors have realized that doing this would result in a less reliable and accurate determination of the level of the interface than is obtainable through embodiment of the present invention.

Figure 11:
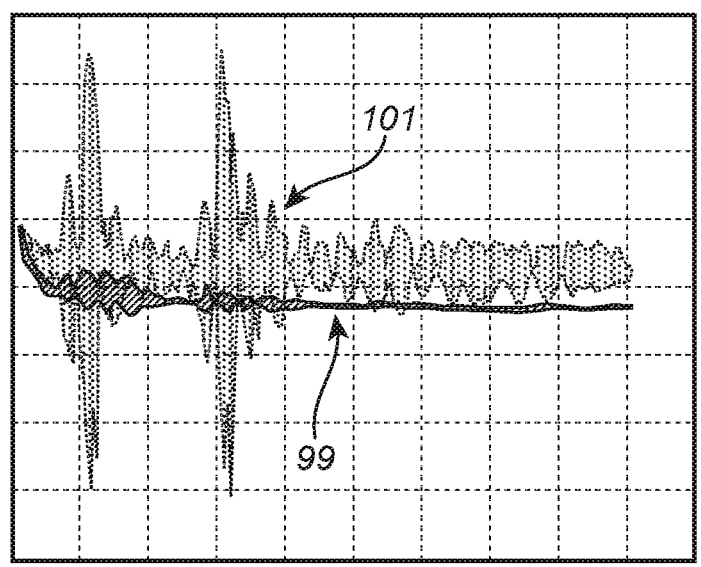
FIG. 11 is a diagram illustrating the measurement error introduced by signal interacting structures in the form of example reflectors, in the first measurement channel and the second measurement channel, respectively.

FIG. 11 is a diagram illustrating the measurement error introduced by signal interacting structures in the form of example reflectors, and includes a first curve 99 indicating the measurement error as a function of distance to the interface 13 for the first measurement channel including the first transceiver 21, and a second curve 101 indicating the measurement error as a function of distance to the interface 13 for the second measurement channel including the second transceiver 23.

The first curve 99 indicates that the measurement error is relatively small and that the variation in measurement error is also relatively small across the measurement range. In contrast, the second curve 101 indicates that the measurement error is considerably larger across the measurement range, and exhibits two distinct peaks in measurement error for distances corresponding to the positions of the reflectors 53a-b along the tubular waveguide 17.

The person skilled in the art realizes that the present invention by no means is limited to the preferred embodiments described above. On the contrary, many modifications and variations are possible within the scope of the appended claims.

What is claimed is:

1. A radar level gauge system for determining a level of an interface between liquid phase product and vapor phase product in a tank, and a density distribution in said liquid phase product, said radar level gauge system comprising:
a first transceiver for generating, transmitting and receiving electromagnetic signals having a first set of signal properties;
a second transceiver for generating, transmitting and receiving electromagnetic signals having a second set of signal properties different from said first set of signal properties;
an antenna coupled to said first transceiver and to said second transceiver, said antenna being arranged to radiate an electromagnetic first transmit signal having said first set of signal properties, and an electromagnetic second transmit signal having said second set of signal properties, and to receive a first reflection signal resulting from reflection of the first transmit signal and a second reflection signal resulting from reflection of the second transmit signal;
a tubular waveguide extending from a top of the tank towards a bottom of the tank, said tubular waveguide being arranged and configured to guide said first transmit signal and said second transmit signal radiated by said antenna towards said interface between liquid phase product and vapor phase product and into said liquid phase product, and to guide said first reflection signal and said second reflection signal back towards said antenna;
at least a first plurality of signal interacting structures arranged at different levels along a first segment of said tubular waveguide, each signal interacting structure in said first plurality of signal interacting structures being configured to selectively interact with said second transmit signal to contribute to said second reflection signal; and
processing circuitry connected to said first transceiver and said second transceiver, said processing circuitry being configured to determine said level of the interface between liquid phase product and vapor phase product based on a relation between said first transmit signal and said first reflection signal, and said density distribution in said liquid phase product based on a relation between said second transmit signal and said second reflection signal,
wherein each signal interacting structure in said first plurality of signal interacting structures is a reflecting structure arranged and configured to exhibit a first reflection coefficient for said first transmit signal and a second reflection coefficient for said second transmit signal, a ratio between said first reflection coefficient and said second reflection coefficient being less than 1:2, and
wherein said processing circuitry is configured to determine:
a first measure indicative of a distance between a first signal interacting structure and a second signal interacting structure in said first plurality of signal interacting structures based on a relation between said second transmit signal and said second reflection signal;
a second measure indicative of a distance between a third signal interacting structure and a fourth signal interacting structure in said first plurality of signal interacting structures based on a relation between said second transmit signal and said second reflection signal;
a first average density for a first level range in said tank based on said first measure; and
a second average density for a second level range in said tank based on said second measure.

2. The radar level gauge system according to claim 1, wherein said first plurality of signal interacting structures comprises at least three signal interacting structures, mutually spaced apart along the first segment of said tubular waveguide.

3. The radar level gauge system according to claim 1, wherein said first set of signal properties comprises a first polarization, and said second set of signal properties comprises a second polarization, different from said first polarization.

4. The radar level gauge system according to claim 3, wherein said first polarization is a first linear polarization, and said second polarization is a second linear polarization, orthogonal to said first linear polarization.

5. The radar level gauge system according to claim 1, wherein said first set of signal properties comprises a first propagation mode, and said second set of signal properties comprises a second propagation mode, different from said first propagation mode.

6. A radar level gauge system for determining a level of an interface between liquid phase product and vapor phase product in a tank, and a density distribution in said liquid phase product, said radar level gauge system comprising:
a first transceiver for generating, transmitting and receiving electromagnetic signals having a first set of signal properties;
a second transceiver for generating, transmitting and receiving electromagnetic signals having a second set of signal properties different from said first set of signal properties;

an antenna coupled to said first transceiver and to said second transceiver, said antenna being arranged to radiate an electromagnetic first transmit signal having said first set of signal properties, and an electromagnetic second transmit signal having said second set of signal properties, and to receive a first reflection signal resulting from reflection of the first transmit signal and a second reflection signal resulting from reflection of the second transmit signal;

a tubular waveguide extending from a top of the tank towards a bottom of the tank, said tubular waveguide being arranged and configured to guide said first transmit signal and said second transmit signal radiated by said antenna towards said interface between liquid phase product and vapor phase product and into said liquid phase product, and to guide said first reflection signal and said second reflection signal back towards said antenna;

at least a first plurality of signal interacting structures arranged at different levels along a first segment of said tubular waveguide, each signal interacting structure in said first plurality of signal interacting structures being configured to selectively interact with said second transmit signal to contribute to said second reflection signal; and processing circuitry connected to said first transceiver and said second transceiver, said processing circuitry being configured to determine said level of the interface between liquid phase product and vapor phase product based on a relation between said first transmit signal and said first reflection signal, and said density distribution in said liquid phase product based on a relation between said second transmit signal and said second reflection signal wherein:

said radar level gauge system further comprises a second plurality of signal interacting structures arranged at different levels along a second segment of said tubular waveguide different from said first segment, each signal interacting structure in said second plurality of signal interacting structures being configured to selectively interact with said first transmit signal to contribute to said first reflection signal; and said processing circuitry is configured to:
  determine, for levels along said first segment of said tubular waveguide, said level of the interface between liquid phase product and vapor phase product based on a relation between said first transmit signal and said first reflection signal, and said density distribution in said liquid phase product based on said second reflection signal along said first segment of said tubular waveguide and based on said first reflection signal along said second segment of said tubular waveguide; and
  determine, for levels along said second segment of said tubular waveguide, said level of the interface between liquid phase product and vapor phase product based on a relation between said second transmit signal and said second reflection signal, and said density distribution in said liquid phase product based on said first reflection signal along said second segment of said tubular waveguide.

7. A method of determining a level of an interface between liquid phase product and vapor phase product in a tank, and a density distribution in said liquid phase product, using a radar level gauge system comprising: a first transceiver; a second transceiver; an antenna coupled to said first transceiver and to said second transceiver; a tubular waveguide extending from a top of the tank towards a bottom of the tank; at least a first plurality of signal interacting structures arranged at different levels along a first segment of said tubular waveguide, each signal interacting structure in said first plurality of signal interacting structures being configured to selectively interact with electromagnetic signals having a given set of signal properties; and processing circuitry connected to said first transceiver and said second transceiver, said method comprising the steps of:
  transmitting, by said first transceiver, an electromagnetic first transmit signal having a first set of signal properties, different from said given set of signal properties;
  transmitting, by said second transceiver, an electromagnetic second transmit signal having a second set of signal properties, constituting said given set of signal properties;
  radiating, by said antenna, said first transmit signal and said second transmit signal into said tubular waveguide;
  receiving, by said antenna, an electromagnetic first reflection signal resulting from reflection of said first transmit signal, and an electromagnetic second reflection signal resulting from reflection of said second transmit signal;
  determining, by said processing circuitry, said level of the interface between liquid phase product and vapor phase product based on a relation between said first transmit signal and said first reflection signal;
  determining a first measure indicative of a distance between a first signal interacting structure and a second signal interacting structure in said first plurality of signal interacting structures based on a relation between said second transmit signal and said second reflection signal;
  determining a second measure indicative of a distance between a third signal interacting structure and a fourth signal interacting structure in said first plurality of signal interacting structures based on a relation between said second transmit signal and said second reflection signal;
  determining a first average density for a first level range in said tank based on said first measure; and
  determining a second average density for a second level range in said tank based on said second measure.

* * * * *